United States Patent
Cui

(10) Patent No.: US 12,160,868 B2
(45) Date of Patent: Dec. 3, 2024

(54) ELECTRONIC DEVICE AND METHOD FOR WIRELESS COMMUNICATION, AND COMPUTER READABLE STORAGE MEDIUM

(71) Applicant: Sony Group Corporation, Tokyo (JP)

(72) Inventor: Tao Cui, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 307 days.

(21) Appl. No.: 17/632,792

(22) PCT Filed: Aug. 7, 2020

(86) PCT No.: PCT/CN2020/107689
§ 371 (c)(1),
(2) Date: Feb. 4, 2022

(87) PCT Pub. No.: WO2021/031881
PCT Pub. Date: Feb. 25, 2021

(65) Prior Publication Data
US 2022/0295536 A1    Sep. 15, 2022

(30) Foreign Application Priority Data
Aug. 16, 2019   (CN) .......................... 201910759087.3

(51) Int. Cl.
*H04W 72/14* (2009.01)
*H04L 1/1607* (2023.01)
(Continued)

(52) U.S. Cl.
CPC .......... *H04W 72/23* (2023.01); *H04L 1/1614* (2013.01); *H04W 72/0446* (2013.01); *H04W 72/1268* (2013.01); *H04W 72/20* (2023.01)

(58) Field of Classification Search
CPC .............. H04L 5/0094; H04L 5/0044; H04W 74/0808; H04W 76/28; H04W 72/1263;
(Continued)

(56) References Cited

U.S. PATENT DOCUMENTS 10,904,909 B2 * 1/2021 Cao ....................... H04L 5/0007
10,925,039 B2 * 2/2021 Kung .................... H04W 76/27
(Continued)

FOREIGN PATENT DOCUMENTS

CN      108574559 A     9/2018
CN      109565686 A     4/2019
(Continued)

OTHER PUBLICATIONS

International Search Report and Written Opinion mailed on Nov. 11, 2020, received for PCT Application PCT/CN2020/107689, Filed on Aug. 7, 2020, 10 pages including English Translation.
(Continued)

*Primary Examiner* — Jung Liu
(74) *Attorney, Agent, or Firm* — XSENSUS LLP

(57) ABSTRACT

The present disclosure provides an electronic device and a method for wireless communication, and a computer-readable storage medium. The electronic device comprises a processing circuit which is configured to acquire control information from a base station, and determine, on the basis of the control information, a plurality of initial positions of uplink configured grant time-domain resources of an unlicensed band which can be accessed by user equipment.

17 Claims, 9 Drawing Sheets

(51) Int. Cl.
*H04W 72/0446* (2023.01)
*H04W 72/1268* (2023.01)
*H04W 72/20* (2023.01)
*H04W 72/23* (2023.01)

(58) Field of Classification Search
CPC ............ H04W 74/0816; H04W 24/08; H04W 74/006; H04W 72/21; H04W 16/14
See application file for complete search history.

(56) References Cited

U.S. PATENT DOCUMENTS

| | | | |
|---|---|---|---|
| 11,382,087 B2* | 7/2022 | Park | H04L 1/1854 |
| 11,405,907 B2* | 8/2022 | Park | H04W 72/23 |
| 11,411,690 B2* | 8/2022 | Moon | A61H 23/006 |
| 2019/0230706 A1 | 7/2019 | Li et al. | |
| 2020/0162208 A1* | 5/2020 | Moon | H04L 1/189 |
| 2020/0213981 A1* | 7/2020 | Park | H04W 72/23 |
| 2021/0345406 A1* | 11/2021 | Myung | H04L 5/0094 |
| 2022/0060571 A1* | 2/2022 | Lee | H04L 69/03 |
| 2022/0256577 A1* | 8/2022 | Oh | H04W 72/21 |
| 2022/0369372 A1* | 11/2022 | Oh | H04W 72/1268 |

FOREIGN PATENT DOCUMENTS

| | | |
|---|---|---|
| CN | 109788427 A | 5/2019 |
| CN | 111182643 A | 5/2020 |
| WO | 2020/063408 A1 | 4/2020 |

OTHER PUBLICATIONS

Intel Corporation, "Enhancements to Configured Grants for NR-Unlicensed", 3GPP TSG RAN WG1 Meeting #97, R1-1906788, May 13-17, 2019, 11 pages.

Vivo, "Outcome of Offline Discussion on Configured Grant Enhancement", 3GPP TSG RAN WG1#96, R1-1903476, Feb. 25-Mar. 1, 2019, 15 pages.

Ericsson: "Configured grant enhancement", 3GPP Draft; RI-1907457 Configured Grant Enhancement, 3rd Generation Partnership Project (3GPP), Mobile Competence Centre 650, Route Des Lucioles ; F-06921 Sophia-Antipolis Cedex ; France vol. RAN WGI, No. Reno, NV, USA; May 13, 2019-May 17, 2019 May 4, 2019 (May 4, 2019), XP051709470, Retrieved from the Internet: URL:http://www.3gpp.org/ftp/tsg%5Fran/WG1% 5FRL1/TSGR1%5F97/Docs/RI%2D1907457%2Ezip [retrieved on 2019-05-04].

Huawei et al: "Transmission with configured grant in NR unlicensed band", 3GPP Draft; R1-1906047, 3rd Generation Partnership Project (3GPP), Mobile Competence Centre ; 650, Route Des Lucioles ; F-06921 Sophia-Antipolis Cedex ; France vol. RAN WG1, No. Reno, USA; May 13, 2019-May 17, 2019 May 13, 2019 (May 13, 2019), XP051727504, Retrieved from the Internet: URL:http://www.3gpp.org/ftp/Meetings%5F3G PP%5FSYNC/RAN 1 /Docs/R1°ℏ2D1906047%2Ezip [retrieved on May 13, 2019].

Lenovo et al: "HARO enhancement for NR-U", 3GPP Draft; R1-1906283-FINAL, 3rd Generation Partnership Project (3GPP), Mobile Competence Centre ; 650, Route Des Lucioles ; F-06921 Sophia-Antipolis Cedex ; France vol. RAN WG1, No. Reno, USA; May 13 2019-May 17, 2019 May 13, 2019 (May 13, 2019), XP051727735, Retrieved from the Internet: URL:http://www.3gpp.org/ftp/Meetings%5F3G PP%5FSYNC/RAN 1 /Docs/R1°ℏ2D1906283%2Ezip [retrieved on May 13, 2019].

Mediatek Inc: "Discussion on NR-U configured grant", 3GPP Draft; RI-1906546_DISCUSSION on NR-U Configured Grant_MTK_Final, 3rd Generation Partnership Project (3GPP), Mobile Competence Centre ; 650, Route Des Lucioles ; F-06921 Sophia-Antipolis Cedex ; F vol. RAN WGI, No. Reno, USA; May 13, 2019-May 17, 2019 May 13, 2019 (May 13, 2019), XP051727997, Retrieved from the Internet: URL: http://www.3gpp.org/ftp/Meetings%5F3GP P%5FSYNC/RAN1/Docs/RI%2D1906546%2Ezip [retrieved on May 13, 2019].

Qualcomm Incorporated: "Enhancement to configured grants in NR unlicensed", 3GPP Draft; RI-1907264 7.2.2.2.4 Enhancements to Configured Grants for NR-U, 3rd Generation Partnership Project (3GPP), Mobile Competence Centre ; 650, Route Des Lucioles ; F-06921 Sophia-Antipolis CE vol. RAN WGI, No. Reno, US; May 13, 2019-May 17, 2019 May 13, 2019 (May 13, 2019), XP051728704, Retrieved from the Internet: URL:http://www.3gpp.org/ftp/Meetings% 5F3GP P%5FSYNC/RAN1/Docs/RI%2D1907264%2Ezip [retrieved on May 13, 2019].

Sony: "Enhancements to Configured Grants in NR-U", 3GPP Draft; R1-1907193 NR-U_CG_Enhancements_Draft, 3rd Generation Partnership Project (3GPP), Mobile Competence Centre ; 650, Route Des Lucioles ; F-06921 Sophia-Antipolis Cedex ; France vol. RAN WG1, No. Reno, USA; May 13, 2019-May 17, 2019 May 13, 2019 (May 13, 2019), XP051728636, Retrieved from the Internet: URL:http://www.3gpp.org/ftp/Meetings%5F3G PP%5FSYNC/RAN 1 /Docs/R1°ℏ2D1907193%2Ezip[retrieved on May 13, 2019].

* cited by examiner

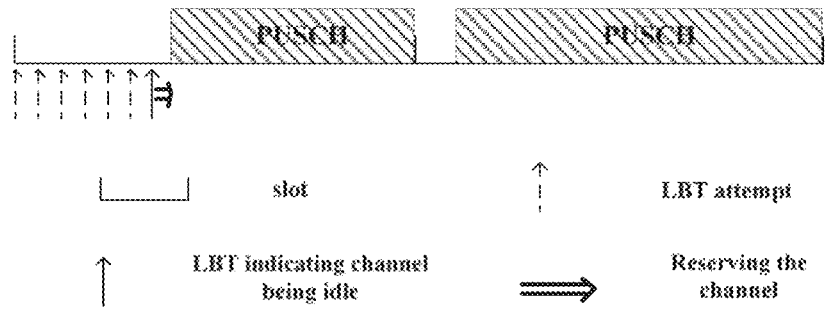
Figure 3
| S | L | L-1 | Last symbol | SLIV | Valid mapping type (conventional CP) PDSCH | Valid mapping type (conventional CP) PUSCH |
|---|---|---|---|---|---|---|
| ...... | | | | | | |
| 0-13 | 14-1 | 13-0 | 14-1 | 127 | | Type A, Type B |
Figure 4
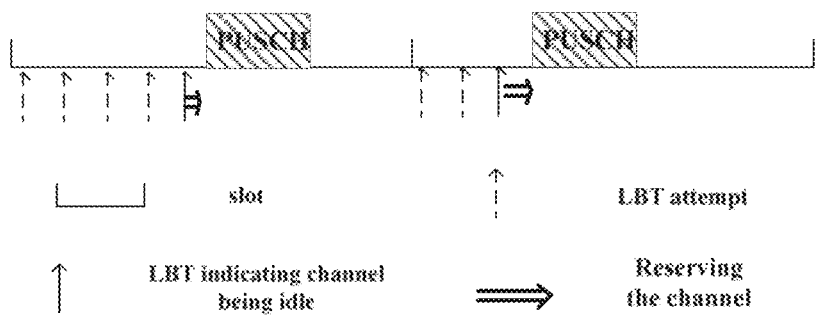
Figure 5

ELECTRONIC DEVICE AND METHOD FOR WIRELESS COMMUNICATION, AND COMPUTER READABLE STORAGE MEDIUM

CROSS-REFERENCE TO RELATED APPLICATIONS

The present application is based on filing PCT/CN2020/107689, filed Aug. 7, 2020, and claims priority to Chinese Patent Application No. 201910759087.3, titled "ELECTRONIC DEVICE AND METHOD FOR WIRELESS COMMUNICATION, AND COMPUTER READABLE STORAGE MEDIUM", filed on Aug. 16, 2019 with the China National Intellectual Property Administration (CNIPA), each of which is incorporated herein by reference in its entirety.

FIELD

The present disclosure relates to the technical field of wireless communications, and in particular to uplink transmission technology in wireless communications on an unlicensed band. More particularly, the present disclosure relates to an electronic apparatus and a method for wireless communications and a computer-readable storage medium.

BACKGROUND

Ultra-reliable and low latency communication (URLLC) is an important one in various application scenarios based on new radio (NR) technology. In order to meet the requirements of URLLC, changes related to a frame structure such as shortened transmission time interval (TTI), mini-slot or the like can be adopted. Basic requirements of ultra-low latency can be met by shortening a minimum unit for scheduling and feedback. In addition, an uplink configured grant (CG) scheme is proposed to reduce the signaling overhead as much as possible, thereby further reducing the delay. In the uplink configured grant, after user equipment (UE) achieves uplink synchronization with a base station, the UE directly transmits uplink data without need of uplink grant and scheduling information transmitted by the base station.

In addition, research on the use of the unlicensed frequency band is paid more and more attention. However, it is required to detect whether a channel is idle before an unlicensed frequency band is used, and this mechanism itself has latency. Therefore, when the uplink configured grant scheme is applied to an unlicensed frequency band, additional design may be required.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: acquire control information from a base station; and determine, based on the control information, a plurality of starting positions of uplink configured grant time domain resources on an unlicensed frequency band at which user equipment is capable of accessing.

According to an aspect of the present disclosure, a method for wireless communications is provided. The method includes: acquiring control information from a base station; and determining, based on the control information, a plurality of starting positions of uplink configured grant time domain resources on an unlicensed frequency band at which user equipment is capable of accessing.

According to another aspect of the present disclosure, an electronic apparatus for wireless communications is provided. The electronic apparatus includes processing circuitry. The processing circuitry is configured to: generate control information, which indicates a plurality of starting positions of uplink configured grant time domain resources on an unlicensed frequency band at which user equipment is capable of accessing; and provide the control information to the user equipment.

According to another aspect of the present disclosure, a method for wireless communications is provided. The method includes: generating control information, which indicates a plurality of starting positions of uplink configured grant time domain resources on an unlicensed frequency band at which user equipment is capable of accessing; and providing the control information to the user equipment.

With the electronic apparatus and method according to the present disclosure, the user equipment is capable of attempting to access into the configured grant time domain resources of an unlicensed frequency band at multiple positions in the time domain, which improves a success rate of the accessing, thereby reducing the latency of uplink transmission on the unlicensed frequency band.

According to other aspects of the present disclosure, there are further provided computer program codes and computer program products for implementing the methods for wireless communications above, and a computer readable storage medium having recorded thereon the computer program codes for implementing the methods for wireless communications described above.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings:

FIG. 3 is a diagram showing an example of PUSCH scheduling based on a slot;

FIG. 4 is a diagram showing an example of setting of an SLIV filed;

FIG. 5 is a diagram showing another example of PUSCH scheduling based on a mini-slot;

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
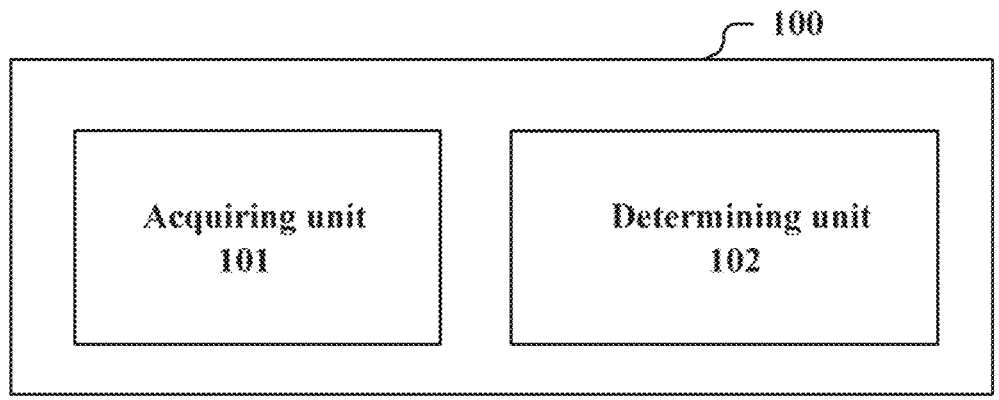
FIG. 1 is a block diagram showing functional modules of an electronic apparatus for wireless communications according to an embodiment of the present disclosure.

FIG. 1 is a block diagram showing functional modules of an electronic apparatus 100 for wireless communications according to an embodiment of the present disclosure. As shown in FIG. 1, the electronic apparatus 100 includes an acquiring unit 101 and a determining unit 102. The acquiring unit 101 is configured to acquire control information from a base station. The determining unit 102 is configured to determine, based on the control information, a plurality of starting positions of uplink configured grant time domain resources on an unlicensed frequency band at which user equipment is capable of accessing.

The acquiring unit 101 and the determining unit 102 may be implemented by one or more processing circuitries. The processing circuitry may be implemented as, for example, a chip. In addition, it should be understood that various functional units in the apparatus shown in FIG. 1 are logical modules divided based on functions implemented by these functional units, and are not intended to limit specific implementations.

The electronic apparatus 100 may be arranged at a side of the user equipment (UE) or may be communicatively connected to the UE. Here it should be further pointed out that the electronic apparatus 100 may be implemented at a chip level or an apparatus level. For example, the electronic apparatus 100 may function as the user equipment itself and further include external apparatuses such as a memory and a transceiver (which are not shown in the drawings). The memory may be used to store programs to be executed and related data information for the user equipment to implement various functions. The transceiver may include one or more communication interfaces to support communications with various apparatuses (for example, a base station, other user equipment and the like). Implementations of the transceiver are not limited herein, which is applicable to other configuration examples of the electronic apparatuses arranged at a side of the user equipment described subsequently.

As described above, in a case that the user equipment (UE) communicates on an unlicensed frequency band, it is required to perform energy detection such as listen before talk (LBT) to detect whether a channel is occupied before transmitting data. Only in a case that the channel is detected to be idle, the UE is capable of accessing in the channel to transmit data. In a case of adopting uplink configured grant, the UE performs LBT on the channel and directly accesses into the uplink configured grant resources in a case that the LBT indicates the channel being idle (that is, the LBT being successful) without acquiring resource scheduling information from a base station, for transmitting a physical uplink shared channel (PUSCH), as shown in FIG. 2a.

Figure 2A:
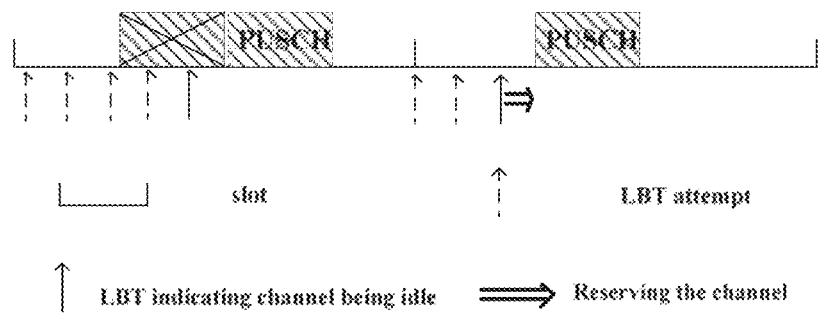
FIGS. 2a and 2b are diagrams each showing an example of PUSCH scheduling based on a mini-slot.

FIG. 2a shows a situation of PUSCH scheduling based on a mini-slot, which is similarly applicable to scheduling based on a slot. As shown in FIG. 2a, the UE attempts to perform LBT. In a first slot, a time instant at which LBT is successfully performed is later than a time instant at which the UE is capable of accessing into the uplink configured grant time domain resources, so that the UE cannot successfully transmit the PUSCH. The UE performs LBT again in a second slot. In the second slot, LBT is successfully performed before a time instant at which the UE is capable of accessing into uplink configured grant time domain resources, and a channel is reserved to the time instant, so that the PUSCH is successfully transmitted.

In this embodiment, in FIG. 2a, the time instant at which the UE is capable of accessing the uplink configured grant time domain resources is referred to as a starting position of uplink configured grant time domain resources on an unlicensed frequency band at which the UE is capable of accessing. FIG. 2a shows an example in which there is one starting position in one slot. In order to improve a success rate of accessing, there may be a plurality of starting positions in one time slot. In this case, the base station may notify the UE of information of the plurality of starting positions through control information. The control information, for example, may be included in at least one of radio resource control (RRC) signaling and downlink control information (DCI).

For example, the determining unit 102 determines, based on the control information, positions of symbols serving as the plurality of starting positions in one slot. As an example, there are 14 symbols in one slot, and the control information may indicate some or all of the symbols as the starting positions. For each of the starting positions, if the UE has successfully performed LBT before the starting position, the UE can access into the uplink configured grant time domain resources to transmit the PUSCH.

In an example, the control information may include a bitmap, and the determining unit 102 is configured to determine, based on each bit of the bitmap, whether each symbol within one slot serves as the starting position. In the case that there are 14 symbols in one time slot, for example, a 14-bit bitmap may be used to indicate whether each of the 14 symbols serves as the starting position. A bit of 1 in the bitmap may indicate that a symbol corresponding to the bit serves as the starting position. Alternatively, a bit of 0 in the bitmap may indicate that a symbol corresponding to the bit serves as the starting position. The meaning indicated by a bit in the bitmap may be agreed on in advance between the base station and the UE. Alternatively, the meaning indicated by a bit in the bitmap may be defined by the base station and notified to the UE through signaling such as RRC signaling.

Alternatively, the control information may include a marker bit, and the determining unit 102 is configured to determine, based on the marker bit, a set of specific symbols serving as the plurality of starting positions in one slot. In this case, a set of specific symbols (for example, symbols 1 to 10) is set as a plurality of starting positions. In a case that the marker bit takes a predetermined value (for example, 1), the plurality of symbols in the set serve as the plurality of starting positions. In this way, the signaling overhead can be reduced. In addition, in a case that the control information includes multiple marker bits, the set of different specific symbols serving as the plurality of starting positions may be determined based on different values of the multiple marker bits. For example, in a case of two marker bits, values "00" of the two marker bits correspond to a set of symbols {0, 3, 5, 7}, values "01" of the two marker bits correspond to a set of symbols {1, 4, 8, 10}, and so on.

In a case of adopting PUSCH scheduling based on a slot, the determining unit 102 is further configured to determine, for each starting position, a size of the uplink configured grant time domain resources as a length from the starting position to an end of one slot, as shown in FIG. 3. In the example shown in FIG. 3, for example, it is determined that each of symbols 1 to 10 may serve as the starting position, and LBT is successfully performed at about a seventh symbol, so that the UE accesses the uplink configured grant time domain resources at an eighth symbol serving as one of the starting positions to transmit the PUSCH. The PUSCH is transmitted until the end of the slot. In other words, the size of the uplink configured grant time domain resources is a length from the starting position of the access to the end of the slot. It can be seen that in a case that the starting position at which the UE accesses into the uplink configured grant time domain resources is earlier, a size of the uplink configured grant time domain resources is larger. By setting a plurality of starting positions in one slot, the chance of the UE accessing into the uplink configured grant time domain resources may be greatly increased, thereby reducing the uplink transmission latency.

In the PUSCH scheduling based on a mini-slot, the determining unit 102, for example, may further be configured to determine, based on an existing SLIV field, the size of the uplink configured grant time domain resources. However, the above a plurality of starting positions determined based on the control information rather than a starting symbol (that is, a starting position) determined based on the SLIV field are used. The existing SLIV field may serve as a part of the control information. Alternatively the determining unit 102 may be configured to determine the size of the uplink configured grant time domain resources based on other control information. That is, the control information further includes other information indicating the size of the uplink configured grant time domain resources.

The SLIV field is included in PUSCH-TimeDomainResourceAllocation of the RRC signaling, which is expressed as following:

```
PUSCH-TimeDomainResourceAllocation ::= SEQUENCE {
    k2                      INTEGER (0..7)
    mappingType             ENUMERATED {typeA, typeB},
    startSymbolAndLength    BIT STRING (SIZE (7)) // SLIV
}
```

Figure 2B:
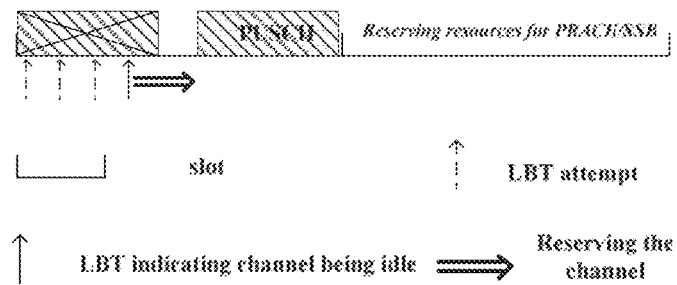

In the example shown in FIG. 2a, in a case that there are a plurality of starting positions in one slot, if in the first slot, the first starting position is missed due to delay of LBT, the UE can still access into the uplink configured grant time domain resources at the second starting position to transmit the PUSCH, as shown in the dashed line block in the Figure. In addition, a similar case is shown in FIG. 2b, where the second slot is reserved for PRACH/SSB, and the UE accesses into the uplink configured grant time domain resources at the second starting position of the first slot, avoiding a large latency.

In another example, the control information may include a SLIV field in RRC signaling, and the determining unit 102 is configured to determine, based on the SLIV field, positions of symbols serving as the plurality of starting positions in one slot.

In this example, a value of the SLIV field is set to one or more of previously unoccupied values among all values of the SLIV field. Previously unoccupied values of the SLIV field range from 105 to 127. It can be designed so that different values of the SLIV respectively correspond to different sets of symbols serving as the plurality of starting positions. The correspondence, for example, may be pre-stored in the base station and the UE in various forms, so that the UE can determine a set of symbols serving as the plurality of starting positions when acquiring the value of the SLIV field.

Exemplarily, SLIV=105 may be used to indicate a case where symbols {0, 3, 4, 5, 7} serve as the plurality of starting positions, SLIV=127 may be used to indicate a case where all symbols can serve as the plurality of starting positions, and so on. It should be understood that the examples herein are only for ease of understanding and are not limited. FIG. 4 shows an example of setting of an SLIV field. As shown in FIG. 4, in addition to existing values of the SLIV, the SLIV may also take a value of 127, which indicates that each of all symbols (symbols 0 to 13) may serve as the starting position for accessing and the size of the uplink configured grant time domain resources for transmitting the PUSCH may be one of 1 symbol 1 to 14 symbols correspondingly. The determining unit 102 may be configured to determine, for each starting position, the size of the uplink configured grant time domain resources as a length from the starting position to an end of one slot.

In addition, in PUSCH scheduling based on a mini-slot, the size of the uplink configured grant time domain resources may be set to other size, and the size, for example, may be indicated by an SLIV field, indicated by other part of the control information, or may have a default size. For ease of understanding, FIG. 5 shows a specific example where the control information indicates that symbols {0, 3, 4, 5, 7} serve as starting positions and the size of the uplink configured grant time domain resources is 4. In a first slot shown in FIG. 5, for example, LBT is successfully performed at about a sixth symbol, so that the UE accesses into the uplink configured grant time domain resources at the symbol 7 serving as a starting position and PUSCH with a length of four symbols is transmitted. In a second slot, for example, LBT is successfully performed at about a third symbol, so that the UE accesses into the uplink configured grant time domain resources at the symbol 4 serving as a starting position and PUSCH with a length of four symbols is transmitted.

In addition, in the PUSCH scheduling based on a mini-slot, one slot may include multiple mini-slots, so that the UE may be configured to transmit PUSCH on multiple mini-slots to improve resource utilization efficiency. In other words, after the UE accesses at a certain starting position, the UE transmits the PUSCH on the uplink configured grant time domain resources having a size determined by the determining unit 102, and then the UE may further transmit PUSCH on time domain resources (which can be considered as allocated additional uplink configured grant time domain resources) with the same size as the uplink configured grant time domain resources and after the uplink configured grant time domain resources.

For example, the control information may include an SLIV field (here the SLIV field indicates only one starting position) in RRC signaling. The determining unit 102 is configured to determine, based on the SLIV field, a first starting position among the plurality of starting positions and the size of the uplink configured grant time domain resources, and determine, based on at least the first starting position and the size of the uplink configured grant time domain resources, other starting positions among the plurality of starting positions.

In an example, the determining unit 102 may determine time domain resources in a slot with the same size as the uplink configured grant time domain resources and after the uplink configured grant time domain resources as time domain resources that can be used by the UE for uplink transmission, until the end of the slot. This operation may be performed by default, for example, written in factory settings, or may be configured by the base station. For example, the determining unit 102 may determine, from a first starting position, a next starting position at intervals of the size of the uplink configured grant time domain resources until the end of a slot, so as to determine the plurality of starting positions. The UE transmits PUSCH on time domain resources with the same size as the uplink configured grant time domain resources starting from each of the plurality of starting positions.

Figure 6:
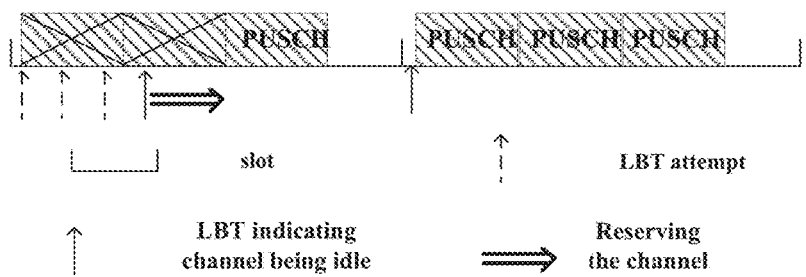
FIG. 6 is a diagram showing another example of PUSCH scheduling based on a mini-slot.

FIG. 6 shows an example in which multiple PUSCHs are allocated to one slot. It is assumed that a starting position set based on SLIV in FIG. 6 corresponds to a symbol {0} and the size of the uplink configured grant time domain resources is four symbols. That is, each transmission of PUSCH occupies four symbols. The determining unit 102 determines a plurality of starting positions {0, 4, 8, 12}. In a first slot, LBT has a long latency and the UE accesses into the uplink configured grant time domain resources at a later position, i.e., the symbol {8}, so that only one transmission of PUSCH is performed. In a second slot, the UE accesses into the uplink configured grant time domain resources at the symbol 0. After performing transmission of four symbols, two transmissions of PUSCH in the unit of four symbols can be performed subsequently until the end of the slot.

In another example, the determining unit 102 may determine, based on the control information, the number of time domain resources with the same size as the uplink configured grant time domain resources which are located after the uplink configured grant time domain resources within one slot and can be further used for uplink transmission of the UE, and determine a plurality of starting positions at least based on the number. For example, the control information may include a newly added field in RRC signaling or DCI, and the determining unit 102 is configured to determine the number based on the newly added field.

Exemplarily, the newly added field may be included in the above PUSCH-TimeDomainResourceAllocation, which is expressed as:

```
PUSCH-TimeDomainResourceAllocation ::= SEQUENCE {
    k2                      INTEGER (0..7)
    mappingType             ENUMERATED {typeA, typeB},
    startSymbolAndLength    BIT STRING (SIZE (7)) // SLIV
    repK0                   INTEGER (0..7)
}
``` repK0 represents the newly added field. FIG. 6 is still taken as an example. For example, repK0 may be set to be 2. As described above, in the first slot, the UE accesses into the uplink configured grant time domain resources at a later position, so that the number of remaining symbols after one transmission of PUSCH is not enough for another transmission of PUSCH. In this case, repK0 is ignored. In the second slot, based on the repK0, after one transmission of PUSCH occupying four symbols, two transmissions of PUSCH where each transmission occupies four symbols are subsequently performed.

It should be understood that on the time domain resources with the same size as the uplink configured grant time domain resources which are located after the uplink configured grant time domain resources, the UE may transmit the same transmission blocks (TBs) or different TBs. In other words, the UE may retransmit the same data or transmit new data on the time domain resources with the same size as the uplink configured grant time domain resources, which is not limited.

It can be seen that in a case of there being a plurality of starting positions, a starting position at which the UE accesses into the uplink configured grant time domain resources is dependent on the situation of the LBT performing. Therefore, the determining unit 102 is further configured to include information of a starting position of the uplink configured grant time domain resources which are actually accessed in configured grant-uplink control information (CG-UCI), to be provided to the base station. In this way, the base station may acquire knowledge of the starting position of the PUSCH through CG-UCI, so as to receive the data correctly.

In conclusion, the electronic apparatus 100 according to this embodiment is capable of attempting to access into the uplink configured grant time domain resources on the unlicensed frequency band at multiple positions in time domain, improving the success rate of the access and reducing the latency of uplink transmission on the unlicensed frequency band.

Second Embodiment

Figure 7:
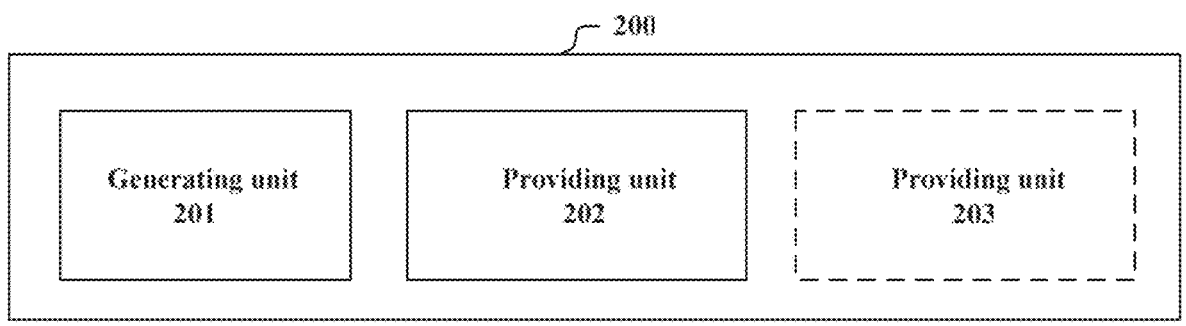
FIG. 7 is a block diagram showing functional modules of an electronic apparatus for wireless communications according to another embodiment of the present disclosure.

FIG. 7 is a block diagram showing functional modules of an electronic apparatus 200 according to an embodiment of the present disclosure. As shown in FIG. 7, the electronic apparatus 200 includes a generating unit 201 and a providing unit 202. The generating unit 201 is configured to generate control information which indicates a plurality of starting positions of uplink configured grant time domain resources on an unlicensed frequency band at which user equipment is capable of accessing. The providing unit 202 is configured to provide the control information to the user equipment.

The generating unit 201 and the providing unit 202 may be implemented by one or more processing circuitries. The processing circuitry may be implemented as, for example, a chip. In addition, it should be understood that various functional units in the apparatus shown in FIG. 7 are logical modules divided based on functions implemented by these functional units, and are not intended to limit specific implementations.

The electronic apparatus 200 may be arranged at a side of a base station or may be communicatively connected to the base station. Here it should be pointed out that the electronic apparatus 200 may be implemented at a chip level or an apparatus level. For example, the electronic apparatus 200 may serve as the base station itself and further include external apparatuses such as a memory and a transceiver (which are not shown in the drawings). The memory may be used to store programs to be executed and related data information for the base station to implement various functions. The transceiver may include one or more communication interfaces to support communications with various apparatuses (for example, user equipment, other base stations and the like). Implementations of the transceiver are not limited herein.

Similar to the first embodiment, the control information may indicate positions of symbols serving as the plurality of starting positions in one slot. The UE accesses the uplink configured grant time domain resources at one of the plurality of starting positions indicated by the control information.

For example, the control information may include a bitmap, and each bit of the bitmap determines whether each symbol within one slot serves as the starting position. For each bit, it may be set to be 0 or 1 to indicate whether a symbol corresponding to the bit serves as the starting position. For example, a bitmap of "01001001001000" indicates that symbols {1, 4, 7, 10} serve as starting positions, and the UE may access into the uplink configured grant time domain resources at positions corresponding to the symbols. A meaning indicated by a bit in the bitmap may be agreed on in advance between the base station and the UE. Alternatively, the meaning indicated by a bit in the bitmap may be defined by the base station and notified to the UE through signaling such as RRC signaling.

Alternatively/as a supplement, the control information may include a marker bit, and the marker bit taking a specific value indicates a set of specific symbols serving as the plurality of starting positions in one slot. For example, a set of specific symbols (for example, symbols 1 to 10) are set to serve as the plurality of starting positions. In a case that the marker bit takes a predetermined value (for example, 1), it indicates that multiple symbols in the set serve as the plurality of starting positions. In addition, in a case that the control information includes multiple marker bits, different values of the multiple marker bits may be used to indicate a set of different specific symbols serving as the plurality of starting positions. For example, in a case of two marker bits, values "00" of the two marker bits correspond to a set of symbols {0, 3, 5, 7}, values "01" of the two marker bits correspond to a set of symbols {1, 4, 8, 10}, and so on. In this way, signaling overhead can be reduced.

In addition, the control information may include an SLIV field in RRC signaling, for indicating positions of symbols serving as the plurality of starting positions in one slot. For example, a value of the SLIV field may be one or more of previously unoccupied values among all values of the SLIV field. Details have been described in the first embodiment with reference to FIG. 4, and are not repeated herein.

The UE accesses into the uplink configured grant time domain resources at one of the plurality of starting positions indicated by the control information. In an example, for example, in PUSCH scheduling based on a slot, the UE may transmit the PUSCH using the time domain resources starting from the starting position to the end of the current slot. This configuration may be default between the base station and the UE, for example, written in factory settings, or be configured by the base station through RRC signaling. In PUSCH scheduling based on a mini-slot, the control information, for example, may indicate the size of the uplink configured grant time domain resources through the SLIV field or another part of the control information, so that the UE can determine a length of symbols which can be occupied by transmission of PUSCH. Alternatively, the size of the uplink configured grant time domain resources may be default.

In another example, for example, in PUSCH scheduling based on a mini-slot, the UE may be configured to transmit PUSCH on multiple mini-slots to improve the resource utilization efficiency. In this case, for example, the control information may include a field that indicates the number of time domain resources with the same size as the uplink configured grant time domain resources which are located after the uplink configured grant time domain resources within one slot and can be further used for uplink transmission of the UE. The control information may include a newly added field in RRC signaling or DCI to indicate the number. For example, the newly added field may be included in PUSCH-TimeDomainResourceAllocation of RRC signaling.

Alternatively, the UE may perform uplink transmission on time domain resources with the same size as the uplink configured grant time domain resources which are located after the uplink configured grant time domain resources within one slot, until the end of the one slot. This configuration may be default between the base station and UE, for example, written in factory settings, or be configured by the base station through RRC signaling. It should be noted that it is implicitly determined the number of time domain resources with the same size as the uplink configured grant time domain resources which are located after the uplink configured grant time domain resources within one slot and can be further used for uplink transmission of the UE.

For example, the control information may further include an SLIV field for indicating a first starting position among the plurality of starting positions and the size of the uplink configured grant time domain resources. In this case, the SLIV field may take a previously occupied value among all values of the SLIV field. The control information indicates a plurality of starting positions by combining the first starting position, the size of the uplink configured grant time domain resources and the number described above. Details are described in the first embodiment with reference to FIG. 6, and are not repeated herein.

For example, the providing unit 202 may provide the control information via at least one of the RRC signaling and the DCI.

In addition, as shown in the dashed line block in FIG. 7, the electronic apparatus 200 may further include an acquiring unit 203. The acquiring unit 203 is configured to acquire CG-UCI from the UE. The CG-UCI includes information of a starting position of the uplink configured grant time domain resources into which the UE actually accesses.

The base station indicates a plurality of starting positions based on the control information, so that the UE may access into the uplink configured grant time domain resources at any one of the plurality of starting positions. However, the base station cannot determine the starting position at which the UE actually access into the uplink configured grant time domain resources. Through the operation of the acquiring unit 203, the base station may acquire knowledge of the starting position at which the UE accesses into the uplink configured grant time domain resources, so as to determine from which symbol in a slot PUSCH should be received.

In a case that multiple PUSCHs can be allocated to one slot, the acquiring unit 203 is further configured to monitor at the beginning of time domain resources with the same size as the uplink configured grant time domain resources which are located after the uplink configured grant time domain resources within one slot and can be used for uplink transmission of the UE, so that the base station correctly receives one or more PUSCHs transmitted on the time domain resources with the same size as the uplink configured grant time domain resources which are located after the uplink configured grant time domain resources.

In conclusion, with the electronic apparatus 200 according to this embodiment, the UE is capable of attempting to access into the uplink configured grant time domain resources on the unlicensed frequency band at multiple positions in time domain, improving the success rate of UE accessing into the uplink configured grant time domain resources and reducing the latency of uplink transmission on the unlicensed frequency band.

Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 8:
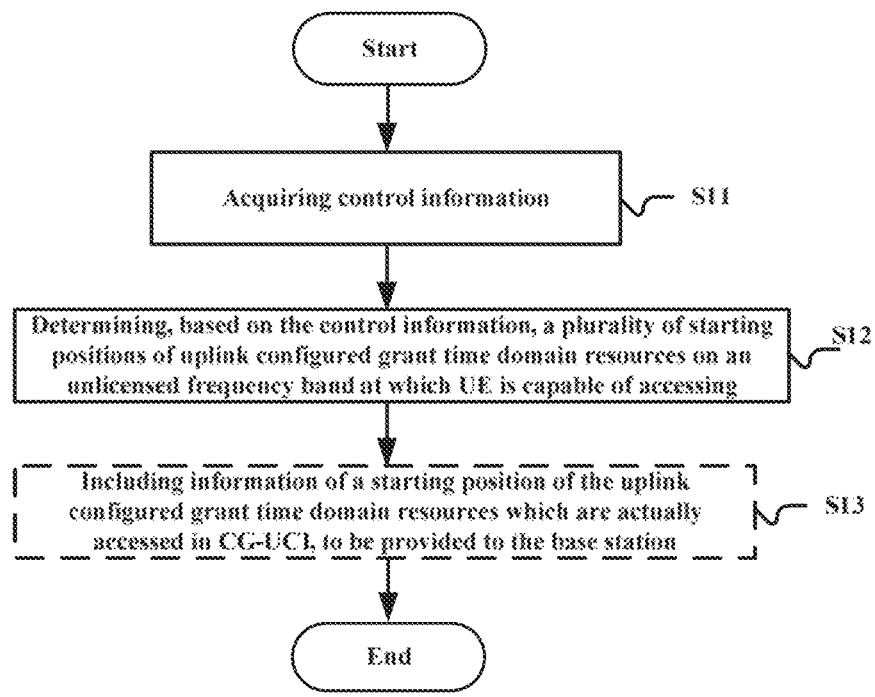
FIG. 8 is a flowchart of a method for wireless communications according to an embodiment of the present disclosure.

FIG. 8 is a flowchart of a method for wireless communications according to an embodiment of the present disclosure. The method includes: acquiring control information from a base station (S11); and determining, based on the control information, a plurality of starting positions of uplink configured grant time domain resources on an unlicensed frequency band at which UE is capable of accessing (S21). The method, for example, may be performed at UE side.

The control information may be included in at least one of RRC signaling and DCI.

In step S12, positions of symbols serving as a plurality of starting positions in one slot may be determined based on the control information. For example, the control information may include a bitmap. In step S12, whether each symbol in the slot serves as the starting position is determined based on each bit of the bitmap. Alternatively, the control information may include a marker bit. In step S12, a set of specific symbols serving as a plurality of starting positions in the slot is determined based on the marker bit.

In an example, the method further includes: determining, for each starting position, the size of the uplink configured grant time domain resources as a length from the starting position to the end of the slot.

In another example, the control information includes an SLIV field in RRC signaling, and the method includes: determining, based on the SLIV field, positions of symbols serving as the plurality of starting positions in one slot. A value of the SLIV field may be one or more of previously unoccupied values among all values of the SLIV field. For each starting position, the size of the uplink configured grant time domain resources may be determined as a length from the starting position to the end of the slot.

In addition, it may also be determined, based on the control information, the number of time domain resources with the same size as the uplink configured grant time domain resources which are located after the uplink configured grant time domain resources within one slot and can be further used for uplink transmission of the UE, and a plurality of starting positions are determined at least based on the number. For example, the control information includes a newly added field in RRC signaling or DCI, and the number is determined based on the newly added field. The newly added field, for example, may be included in PUSCH-TimeDomainResourceAllocation of RRC signaling.

For example, the control information may include an SLIV field in RRC signaling. A first starting position among the plurality of starting positions and the size of the uplink configured grant time domain resources are determined based on the SLIV field, and other starting positions among the plurality of starting positions are determined at least based on the first starting position and the size of the uplink configured grant time domain resources.

The same or different transmission blocks may be transmitted respectively on time domain resources with the same size.

As shown in the dashed line block in FIG. 8, the method may further include a step S13: including information of a starting position of the uplink configured grant time domain resources which are actually accessed in CG-UCI, to be provided to the base station.

Figure 9:
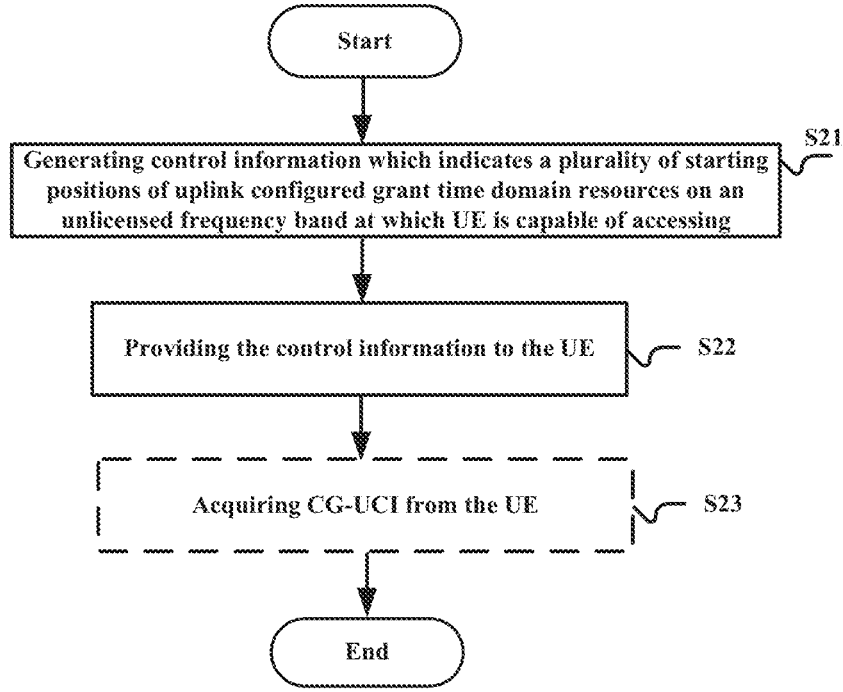
FIG. 9 is a flowchart of a method for wireless communications according to another embodiment of the present disclosure.

FIG. 9 is a flowchart of a method for wireless communications according to another embodiment of the present disclosure. The method includes: generating control information, which indicates a plurality of starting positions of uplink configured grant time domain resources on an unlicensed frequency band at which the UE is capable of accessing (S21); and providing the control information to the UE (S22).

In step S22, the control information may be provided via at least one of RRC signaling and DCI.

For example, the control information indicates positions of symbols serving as a plurality of starting positions in one slot. The control information may include a bitmap, and each bit of the bitmap determines whether each symbol in the one slot serves as the starting position. The control information may include a marker bit that, when taking a specific value, indicates a set of specific symbols serving as the plurality of starting positions in one time slot.

For example, the control information includes an SLIV field in RRC signaling, for indicating positions of symbols serving as the plurality of starting positions in one time slot. A value of the SLIV field may be one or more of previously unoccupied values among all values of the SLIV field.

The control information may further include a field that indicates the number of time domain resources with the same size as the uplink configured grant time domain resources which are located after the uplink configured grant time domain resources within one slot and can be further used for uplink transmission of the UE. The control information may include a newly added field in RRC signaling or DCI to indicate the number. The newly added field, for example, may be included in PUSCH-TimeDomainResourceAllocation of RRC signaling. In addition, the control information may further include an SLIV field, for indicating a first starting position among the plurality of starting positions and the size of the uplink configured grant time domain resources.

As shown in the dashed line block in FIG. 9, the method may further include a step S23: acquiring CG-UCI from the UE, where the CG-UCI includes information of a starting position of the uplink configured grant time domain resources into which the UE actually accesses. In addition, in step S23, monitoring may be performed at beginning of time domain resources with the same size as the uplink configured grant time domain resources which are located after the uplink configured grant time domain resources within one slot and can be used for uplink transmission of the UE.

The methods described above respectively correspond to the apparatus 100 described in the first embodiment and the apparatus 200 described in the second embodiment. For details, one may refer to above relevant descriptions, and the details are not repeated herein. It should be noted that each of the above methods may be used in combination or separately.

The technology according to the present disclosure is applicable to various products.

For example, the electronic apparatus 200 may be implemented as various base stations. The base station may be implemented as any type of evolved node B (eNB) or gNB (5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote wireless head ends (RRH) located at positions different from the main body. In addition, various types of user equipment may each serves as a base station by performing functions of the base station temporarily or semi-permanently.

The electronic apparatus 100 may be implemented as various user equipments. The user equipment may be implemented as a mobile terminal (such as a smartphone, a tablet personal computer (PC), a notebook PC, a portable game terminal, a portable/dongle mobile router, and a digital camera) or a vehicle terminal (such as a vehicle navigation apparatus). The user equipment may also be implemented as a terminal that performs machine-to-machine (M2M) communication (also referred to as a machine type communication (MTC) terminal). Furthermore, the user equipment may be a wireless communication module (such as an integrated circuitry module including a single die) mounted on each of the terminals described above.

[Application Example Regarding a Base Station]

First Application Example

Figure 10:
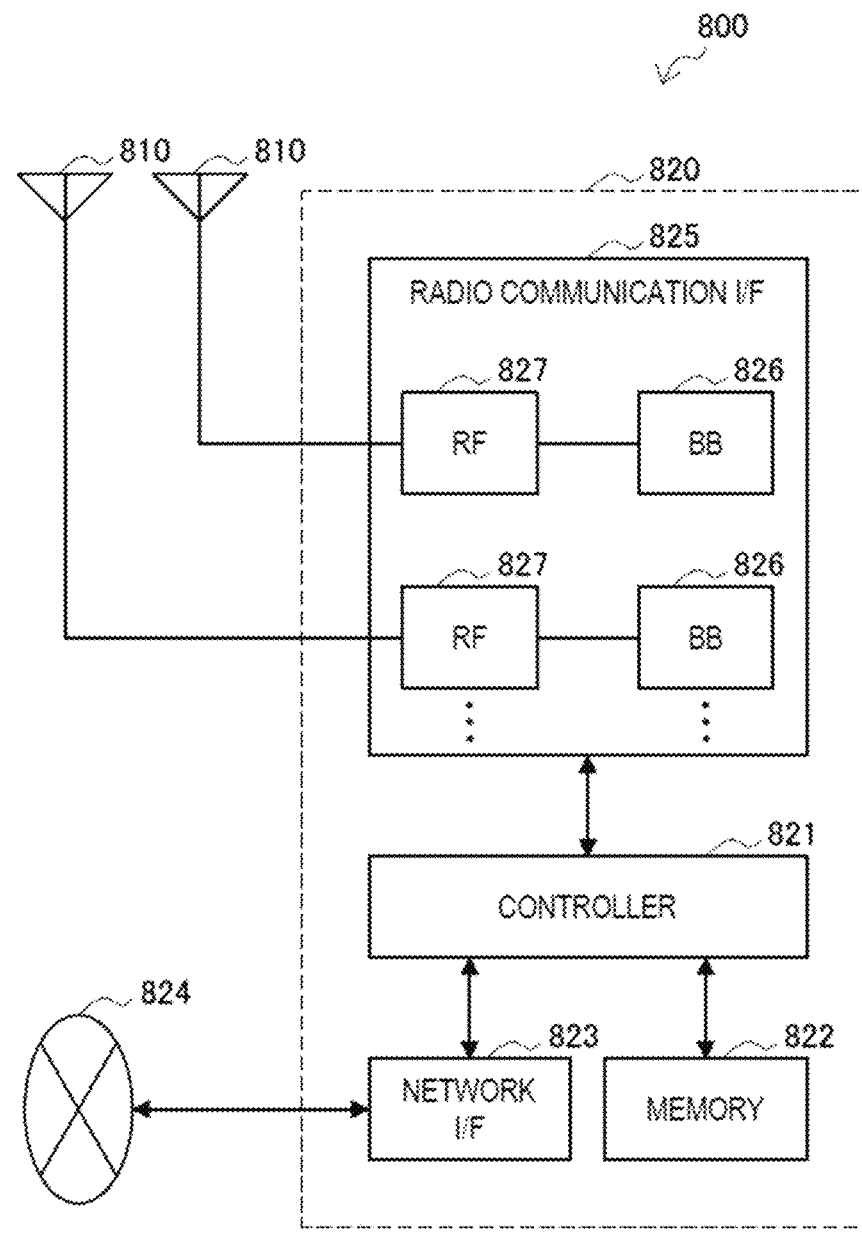
FIG. 10 is a block diagram showing a first example of an exemplary configuration of an eNB or gNB to which the technology according to the present disclosure may be applied.

FIG. 10 is a block diagram showing a first example of an exemplary configuration of an eNB or gNB to which technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 10, the eNB 800 may include the multiple antennas 810. For example, the multiple antennas 810 may be compatible with multiple frequency bands used by the eNB 800. Although FIG. 10 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an Si interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 10, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 10. For example, the multiple RF circuits 827 may be compatible with multiple antenna elements. Although FIG. 10 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 10, a transceiver of the electronic apparatus 200 may be implemented by the radio communication interface 825. At least a part of functions may also be implemented by the controller 821. For example, the controller 821 may indicate a plurality of starting positions of uplink configured grant time domain resources of an unlicensed frequency band at which the UE is capable of accessing by performing functions of the generating unit 201 and the providing unit 202, and determine a starting position at which the UE actually accesses into the uplink configured grant time domain resources by performing functions of the acquiring unit 203.

Second Application Example

Figure 11:
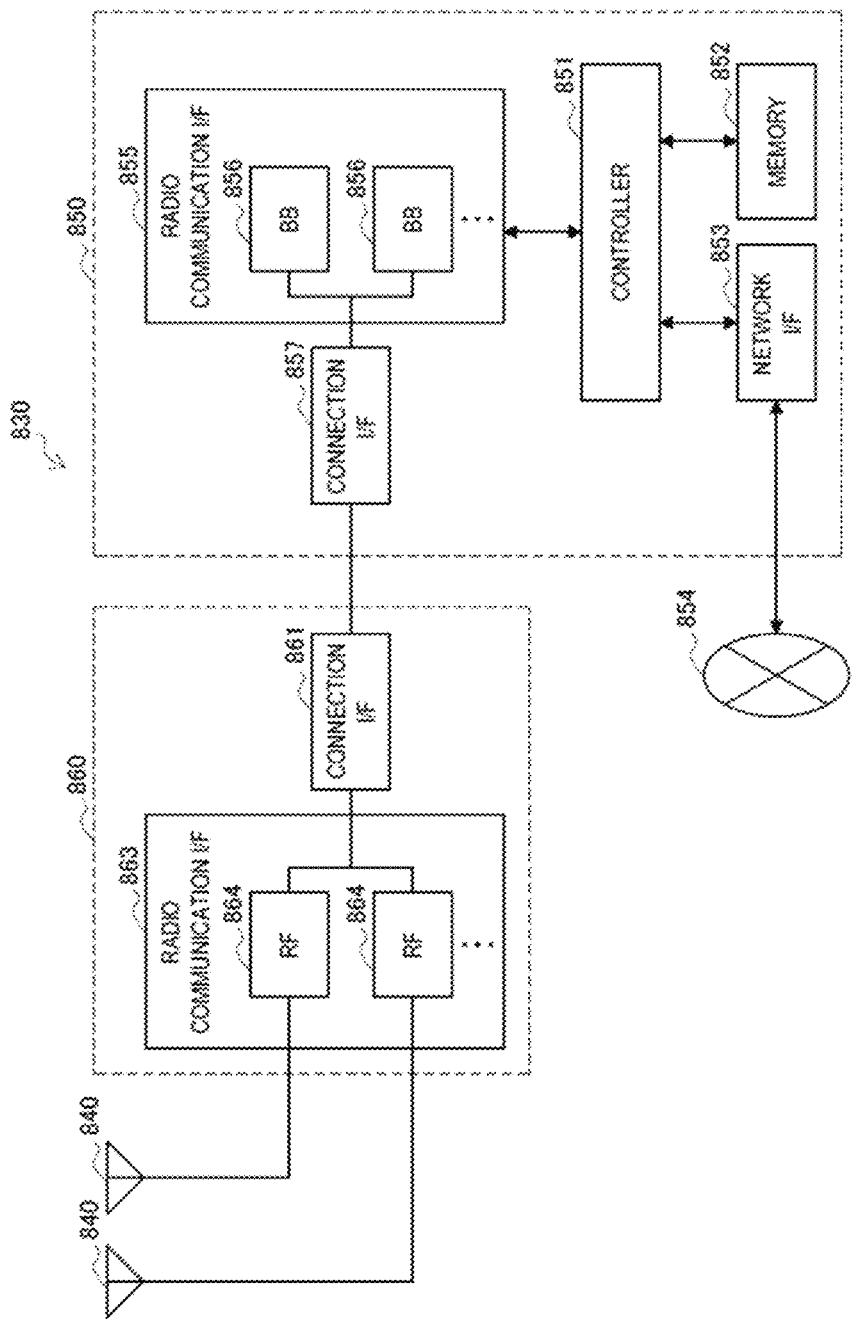
FIG. 11 is a block diagram showing a second example of an exemplary configuration of the eNB or gNB to which the technology according to the present disclosure may be applied.

FIG. 11 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 11, the eNB 830 may include the multiple antennas 840. For example, the multiple antennas 840 may be compatible with multiple frequency bands used by the eNB 830. Although FIG. 11 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 10.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 10, except that the BB processor 856 is connected to an RF circuit 864 of the RRH 860 via the connection interface 857. As show in FIG. 11, the radio communication interface 855 may include the multiple BB processors 856. For example, the multiple BB processors 856 may be compatible with multiple frequency bands used by the eNB 830. Although FIG. 11 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 11. For example, the multiple RF circuits 864 may support multiple antenna elements. Although FIG. 11 shows the example in which the radio communication interface 863 includes the multiple RF circuits 864, the radio communication interface 863 may also include a single RF circuit 864.

In the eNB 830 shown in FIG. 11, a transceiver of the electronic apparatus 200 may be implemented by the radio communication interface 855 and/or the radio communication interface 863. At least a part of functions may also be implemented by the controller 851. For example, the controller 851 may indicate a plurality of starting positions of uplink configured grant time domain resources of an unlicensed frequency band at which the UE is capable of accessing by performing functions of the generating unit 201 and the providing unit 202, and determine a starting position at which the UE actually accesses into the uplink configured grant time domain resources by performing functions of the acquiring unit 203.

<Application Example Regarding User Equipment>

First Application Example

Figure 12:
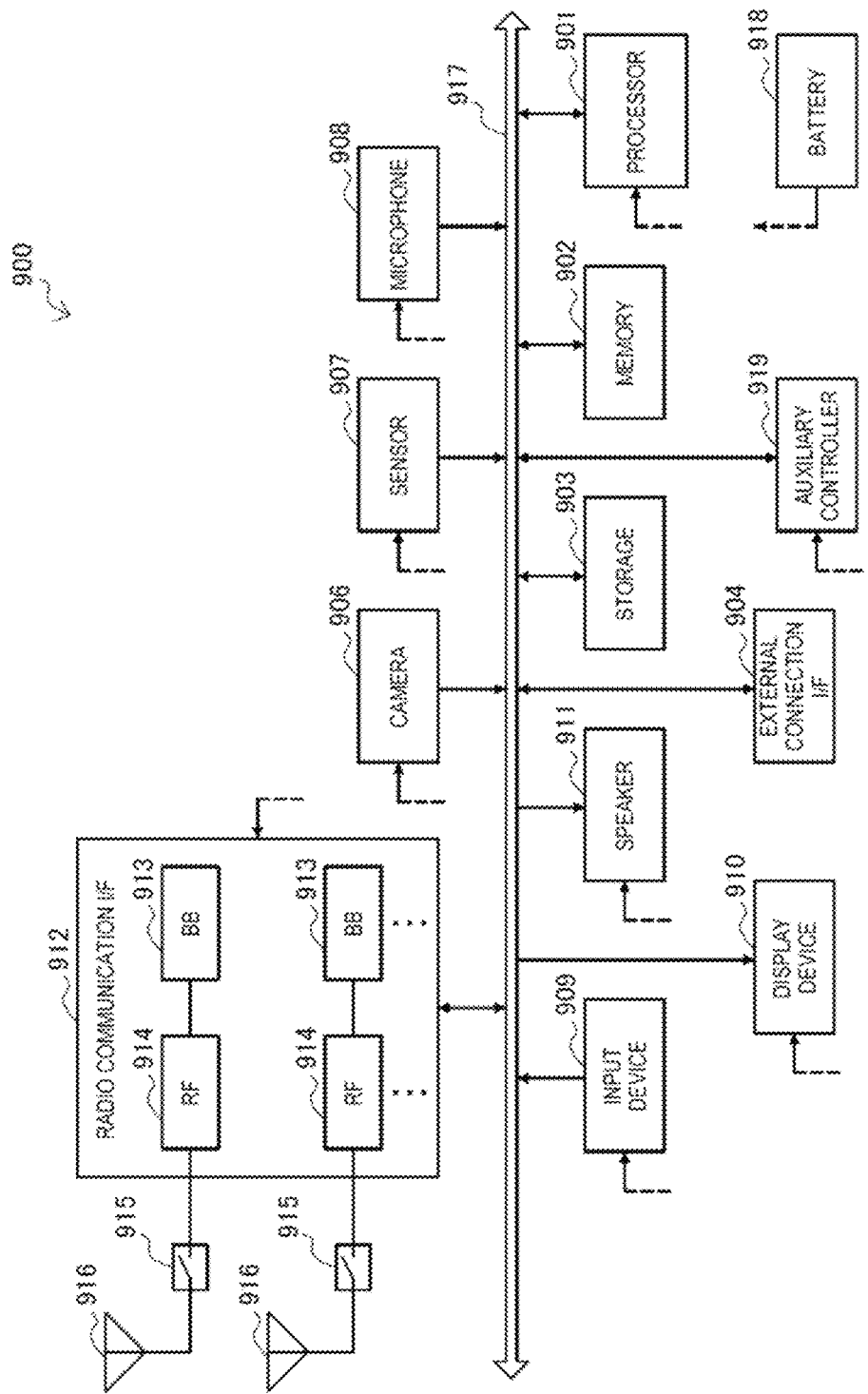
FIG. 12 is a block diagram showing an example of an exemplary configuration of a smartphone to which the technology according to the present disclosure may be applied.

FIG. 12 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 12 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 12. Although FIG. 12 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 12. Although FIG. 12 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 12 via feeder lines that are partially shown as dashed lines in FIG. 24. The auxiliary controller 919, operates a minimum necessary function of the smart phone 900, for example, in a sleep mode.

In the smartphone 900 shown in FIG. 12, a transceiver of the electronic apparatus 100 may be implemented by the radio communication interface 912. At least a part of functions may also be implemented by the processor 901 or the auxiliary controller 919. For example, the processor 901 or the auxiliary controller 919 may determine a plurality of starting positions of uplink configured grant time domain resources of an unlicensed frequency band at which the UE is capable of accessing by performing functions of the acquiring unit 101 and the determining unit 102, thereby performing configured grant uplink transmission on an unlicensed frequency band with a higher success rate and a lower latency.

Second Application Example

Figure 13:
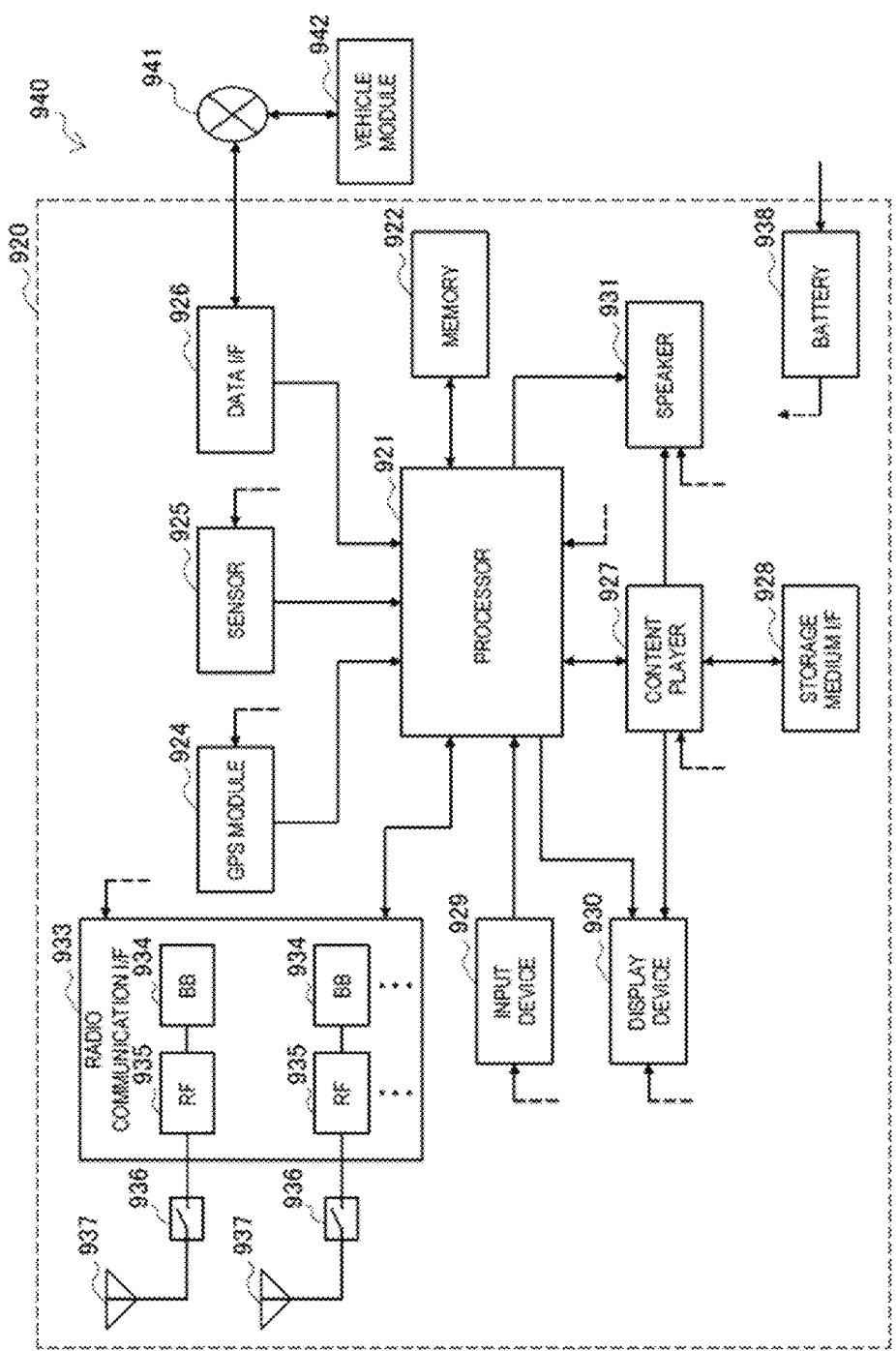
FIG. 13 is a block diagram showing an example of an exemplary configuration of a car navigation apparatus to which the technology according to the present disclosure may be applied.

FIG. 13 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 13. Although FIG. 13 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 13, the car navigation apparatus 920 may include the multiple antennas 937. Although FIG. 13 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 13 via feeder lines that are partially shown as dash lines in FIG. 13. The battery 938 accumulates power supplied from the vehicle.

In the car navigation apparatus 920 shown in FIG. 13, a transceiver or a transmitting unit of the electronic apparatus 100 may be implemented by the radio communication interface 933. At least a part of the functions may also be implemented by the processor 921. For example, the processor 921 may determine a plurality of starting positions of uplink configured grant time domain resources of an unlicensed frequency band at which the UE is capable of accessing by performing functions of the acquiring unit 101 and the determining unit 102, thereby performing configured grant uplink transmission on an unlicensed frequency band with a higher success rate and a lower latency.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1400 shown in FIG. 14) from a storage medium or network, wherein the computer is capable of implementing various functions when installed with various programs.

Figure 14:
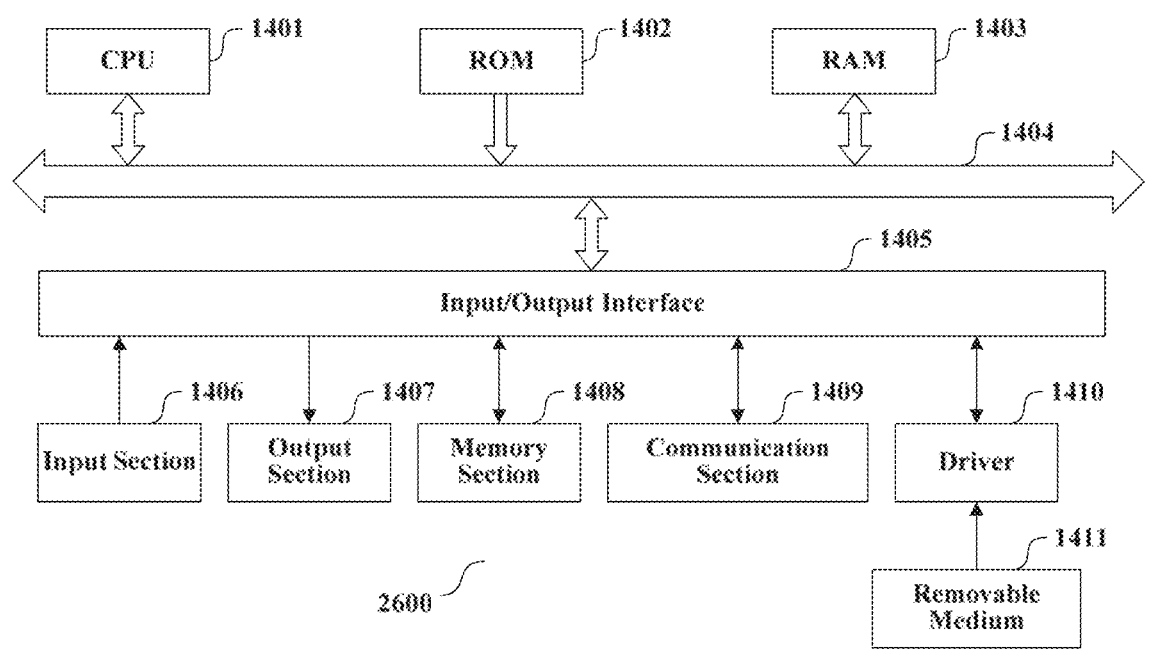
FIG. 14 is a block diagram of an exemplary block diagram illustrating the structure of a general purpose personal computer capable of realizing the method and/or device and/or system according to the embodiments of the present disclosure.

In FIG. 14, a central processing unit (CPU) 1401 executes various processing according to a program stored in a read-only memory (ROM) 1402 or a program loaded to a random access memory (RAM) 1403 from a memory section 1408. The data needed for the various processing of the CPU 1401 may be stored in the RAM 1403 as needed. The CPU 1401, the ROM 1402 and the RAM 1403 are linked with each other via a bus 1404. An input/output interface 1405 is also linked to the bus 1404.

The following components are linked to the input/output interface 1405: an input section 1406 (including keyboard, mouse and the like), an output section 1407 (including displays such as a cathode ray tube (CRT), a liquid crystal display (LCD), a loudspeaker and the like), a memory section 1408 (including hard disc and the like), and a communication section 1409 (including a network interface card such as a LAN card, modem and the like). The communication section 1409 performs communication processing via a network such as the Internet. A driver 1410 may also be linked to the input/output interface 1405, if needed. If needed, a removable medium 1411, for example, a magnetic disc, an optical disc, a magnetic optical disc, a semiconductor memory and the like, may be installed in the driver 1410, so that the computer program read therefrom is installed in the memory section 1408 as appropriate.

In the case where the foregoing series of processing is achieved through software, programs forming the software are installed from a network such as the Internet or a memory medium such as the removable medium 1411.

It should be appreciated by those skilled in the art that the memory medium is not limited to the removable medium 1411 shown in FIG. 14, which has program stored therein and is distributed separately from the apparatus so as to provide the programs to users. The removable medium 1411 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1402 and the memory section 1408 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n)" in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry, configured to:
   acquire control information from a base station; and
   determine, based on the control information, a plurality of starting positions of uplink configured grant time domain resources on an unlicensed frequency band at which user equipment is capable of accessing,
   wherein the processing circuitry is configured to determine, based on the control information, positions of symbols serving as the plurality of starting positions within one slot, and
   wherein the control information comprises:
   a bitmap, and each bit of the bitmap determines whether each symbol within the one slot serves as one of the plurality of starting positions; or
   a marker bit, and the marker bit indicates a set of specific symbols serving as the plurality of starting positions within one slot when taking a specific value.

2. The electronic apparatus according to claim 1, wherein the processing circuitry is further configured to determine, for each starting position of the plurality of starting positions, a size of the uplink configured grant time domain resources as a length from the starting position to an end of the one slot.

3. The electronic apparatus according to claim 1, wherein, the control information is comprised in at least one of radio resource control (RRC) signaling or downlink control information (DCI).

4. The electronic apparatus according to claim 1, wherein, the processing circuitry is further configured to determine, based on the control information, a number of time domain resources with a same size as the uplink configured grant time domain resources which are located after the uplink configured grant time domain resources within the one slot and can be further used for uplink transmission of the user equipment, and determine the plurality of starting positions at least based on the number.

5. The electronic apparatus according to claim 4, wherein the control information comprises a newly added field in radio resource control signaling (RRC) or downlink control information (DCI), and the processing circuitry is configured to determine the number based on the newly added field.

6. The electronic apparatus according to claim 5, wherein the newly added field is comprised in a Physical Uplink Shared Channel; (PUSCH)—TimeDomainResourceAllocation of the RRC signaling.

7. The electronic apparatus according to claim 4, wherein the control information comprises a Start and Length Indicator Value (SLIV) field in radio resource control (RRC) signaling, and the processing circuitry is further configured to determine, based on the SLIV field, a first starting position among the plurality of starting positions and a size of the uplink configured grant time domain resources, and determine, at least based on the first starting position and the size of the uplink configured grant time domain resources, other starting positions among the plurality of starting positions.

8. The electronic apparatus according to claim 1, wherein, the control information comprises a Start and Length Indicator Value (SLIV) field in radio resource control (RRC) signaling, and the processing circuitry is configured to determine, based on the SLIV field, positions of symbols serving as the plurality of starting positions within one slot.

9. The electronic apparatus according to claim 8, wherein a value of the SLIV field is one or more of previously unoccupied values among all values of the SLIV field.

10. The electronic apparatus according to claim 4, wherein the processing circuitry is configured to transmit the same transmission blocks or different transmission blocks on the time domain resources with the same size as the uplink configured grant time domain resources.

11. The electronic apparatus according to claim 1, wherein, the processing circuitry is further configured to comprise information of a starting position of the uplink configured grant time domain resources which are actually accessed in configured grant uplink control information, to be provided to the base station.

12. An electronic apparatus for wireless communications, comprising:
processing circuitry, configured to:
generate control information, which indicates a plurality of starting positions of uplink configured grant time domain resources on an unlicensed frequency band at which a user equipment is capable of accessing; and
provide the control information to the user equipment,
wherein the control information indicates positions of symbols serving as the plurality of starting positions within one slot, and
wherein the control information comprises:
a bitmap, and each bit of the bitmap determines whether each symbol within the one slot serves as one of the plurality of starting positions; or
a marker bit, and the marker bit indicates a set of specific symbols serving as the plurality of starting positions within one slot when taking a specific value.

13. The electronic apparatus according to claim 12, wherein the processing circuitry is configured to provide the control information via at least one of the radio resource control (RRC) signaling or downlink control information (DCI).

14. The electronic apparatus according to claim 12, wherein the control information comprises a Start and Length Indicator Value (SLIV) in radio resource control (RRC) signaling, the SLIV indicating positions of symbols serving as the plurality of starting positions within one slot.

15. The electronic apparatus according to claim 12, wherein the control information further comprises a field for indicating a number of time domain resources with a same size as the uplink configured grant time domain resources which are located after the uplink configured grant time domain resources within one slot and can be further used for uplink transmission of the user equipment.

16. The electronic apparatus according to claim 15, wherein the processing circuitry is further configured to perform monitoring at a beginning of the time domain resources with the same size as the uplink configured grant time domain resources, the time domain resources being located after the uplink configured grant time domain resources within one slot, the time domain resources being used for uplink transmission of the user equipment.

17. A method for wireless communications that is performed by an electronic apparatus, the method comprising:
acquiring control information from a base station; and
determining, based on the control information, a plurality of starting positions of uplink configured grant time domain resources on an unlicensed frequency band at which user equipment is capable of accessing,
wherein the determining comprises determining, based on the control information, positions of symbols serving as the plurality of starting positions within one slot, and
wherein the control information comprises:
a bitmap, and each bit of the bitmap determines whether each symbol within the one slot serves as one of the plurality of starting positions; or
a marker bit, and the marker bit indicates a set of specific symbols serving as the plurality of starting positions within one slot when taking a specific value.

* * * * *